United States Patent
Okada et al.

(10) Patent No.: US 9,062,743 B2
(45) Date of Patent: Jun. 23, 2015

(54) SHOVEL

(71) Applicant: SUMITOMO HEAVY INDUSTRIES, LTD., Tokyo (JP)

(72) Inventors: Takeshi Okada, Kanagawa (JP); Akihiko Inada, Kanagawa (JP); Terukazu Matsugi, Kanagawa (JP); Kazunori Hiranuma, Kanagawa (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 14/219,096

(22) Filed: Mar. 19, 2014

(65) Prior Publication Data

US 2014/0296015 A1 Oct. 2, 2014

(30) Foreign Application Priority Data

Mar. 29, 2013 (JP) ................... 2013-074945

(51) Int. Cl.
  *F16H 3/44* (2006.01)
  *F16H 1/28* (2006.01)
  *E02F 9/12* (2006.01)
  *E02F 9/20* (2006.01)

(52) U.S. Cl.
  CPC ........ *F16H 1/28* (2013.01); *E02F 9/128* (2013.01); *E02F 9/202* (2013.01)

(58) Field of Classification Search
  None
  See application file for complete search history.

(56) References Cited

U.S. PATENT DOCUMENTS

| | | | | |
|---|---|---|---|---|
| 4,227,680 A | * | 10/1980 | Hrescak | 254/344 |
| 4,441,691 A | * | 4/1984 | Nagahara et al. | 254/344 |
| 5,588,931 A | * | 12/1996 | Forster | 475/338 |
| 6,090,006 A | * | 7/2000 | Kingston | 475/323 |
| 6,817,963 B1 | * | 11/2004 | Solka | 475/323 |
| 6,869,380 B2 | * | 3/2005 | Oberstarr | 475/323 |
| 6,890,282 B2 | * | 5/2005 | Oberstarr | 475/323 |
| 7,044,883 B2 | * | 5/2006 | Andersson et al. | 475/331 |
| 7,402,120 B2 | * | 7/2008 | Andersson et al. | 475/323 |
| 2014/0296016 A1 | * | 10/2014 | Okada et al. | 475/159 |

FOREIGN PATENT DOCUMENTS

| | | | |
|---|---|---|---|
| JP | 2008-232270 | | 10/2008 |
| WO | WO 2011102252 A1 | * | 8/2011 |
| WO | WO 2011142235 A1 | * | 11/2011 |
| WO | WO 2012002175 A1 | * | 1/2012 |
| WO | WO 2013161204 A1 | * | 10/2013 |
| WO | WO 2013161205 A1 | * | 10/2013 |
| WO | WO 2014069308 A1 | * | 5/2014 |
| WO | WO 2014069536 A1 | * | 5/2014 |
| WO | WO 2014069539 A1 | * | 5/2014 |
| WO | WO 2014069646 A1 | * | 5/2014 |
| WO | WO 2014119844 A1 | * | 8/2014 |

\* cited by examiner

*Primary Examiner* — Dirk Wright
(74) *Attorney, Agent, or Firm* — IPUSA, PLLC (57) ABSTRACT

A shovel includes a turning drive unit. The turning drive unit includes a turning electric motor, a turning speed reducer configured to transmit the rotational driving force of the turning electric motor to a turnable body, and a brake unit configured to maintain the turnable body in a state where the turning of the turnable body is stopped. The turning speed reducer includes a planetary speed reducer including a planetary carrier. The planetary carrier includes an output shaft part that forms an output shaft and a carrier part that holds a planetary gear in such a manner as to allow the rotation of the planetary gear. The output shaft part and the carrier part are fastened by a fastening member.

4 Claims, 8 Drawing Sheets

SHOVEL

CROSS-REFERENCE TO RELATED APPLICATION

This application is based upon and claims the benefit of priority of Japanese Patent Application No. 2013-074945, filed on Mar. 29, 2013, the entire contents of which are incorporated herein by reference.

BACKGROUND

1. Technical Field

The present invention generally relates to shovels including a turning speed reducer.

2. Description of Related Art

A related-art shovel is known that includes a turning mechanism including a turning electric motor, a first turning speed reducer connected to the output shaft of the turning electric motor, a second turning speed reducer connected to the output shaft of the first turning speed reducer, a third turning speed reducer connected to the output shaft of the second turning speed reducer, and a swing circle connected to the output shaft of the third turning speed reducer.

In this shovel, the rotation of the output shaft of the first turning speed reducer is braked by holding a brake disk, provided around an annular brake connecting part that is spline-connected to the output shaft of the first turning speed reducer, between a pair of brake pads in a casing, which is a stationary member. Furthermore, in this shovel, the planetary carrier and the output shaft of the first turning speed reducer are spline-connected.

SUMMARY

According to an aspect of the present invention, a shovel includes a turning drive unit. The turning drive unit includes a turning electric motor, a turning speed reducer configured to transmit the rotational driving force of the turning electric motor to a turnable body, and a brake unit configured to maintain the turnable body in a state where the turning of the turnable body is stopped. The turning speed reducer includes a planetary speed reducer including a planetary carrier. The planetary carrier includes an output shaft part that forms an output shaft and a carrier part that holds a planetary gear in such a manner as to allow the rotation of the planetary gear. The output shaft part and the carrier part are fastened by a fastening member.

It is to be understood that both the foregoing general description and the following detailed description are exemplary and explanatory and not restrictive of the invention.

DETAILED DESCRIPTION

As mentioned above, in the related-art shovel, the brake connecting part, around which the brake disk is provided, and the planetary carrier are spline-connected to the output shaft of the first turning speed reducer. According to the related art, however, merely connecting the brake connecting part and the planetary carrier to the output shaft of the first turning speed reducer near its center of rotation is disclosed, and there is no mention of the wear of connections, the maintenance and overhaul of components, or the replacement of worn components.

According to an aspect of the invention, a shovel includes a turning speed reducer that has resistance to wear and is easily replaceable.

Figure 1:
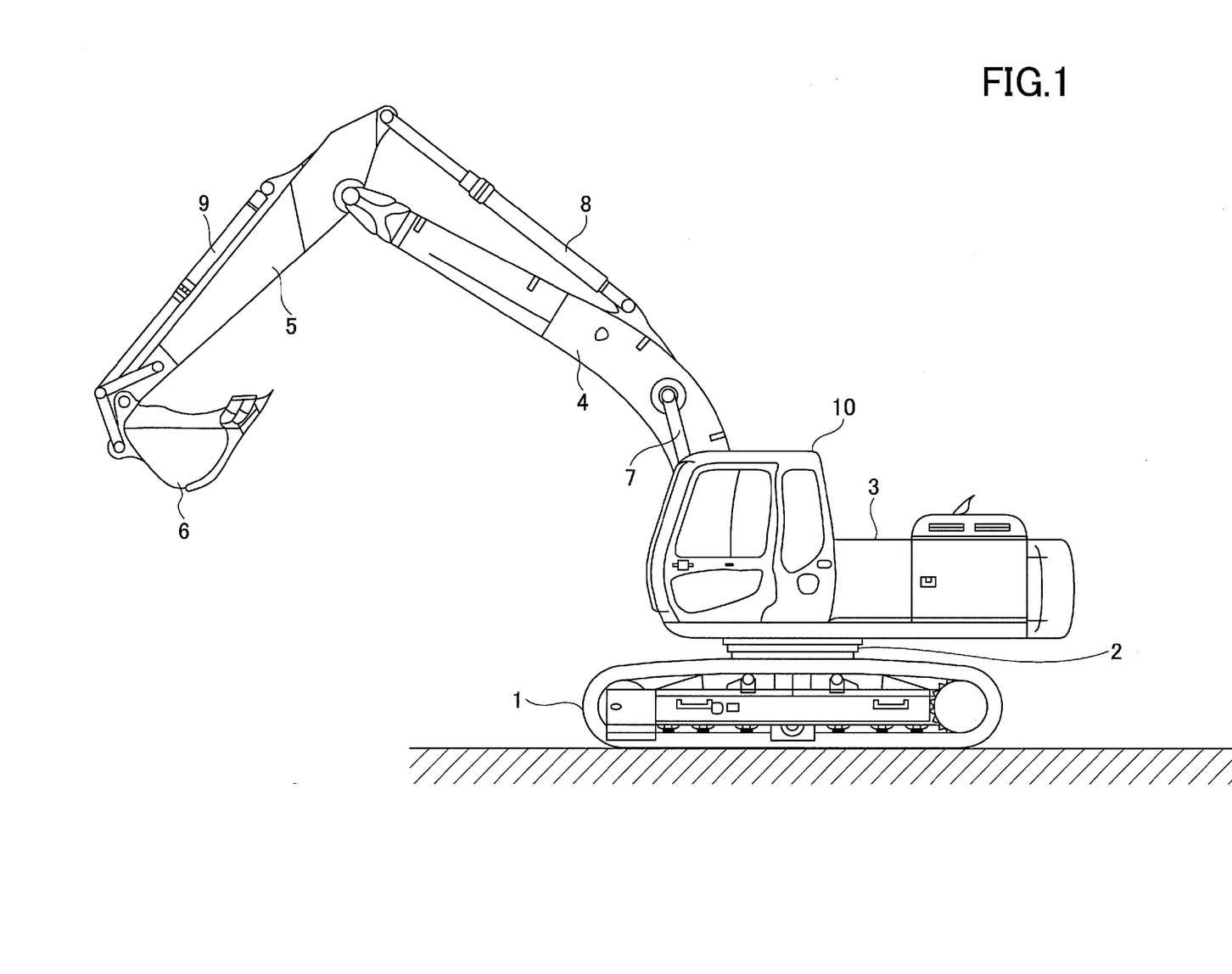
FIG. 1 is a side view of a shovel in which a turning drive unit according to an embodiment of the present invention is incorporated.

First, a description is given of an overall configuration and a drive system configuration of a shovel in which a turning drive unit according to an embodiment of the present invention is incorporated. FIG. 1 is a side view of a shovel in which a turning drive unit according to an embodiment of the present invention is incorporated. The shovel is an example of a construction machine, and a turning drive unit according to an embodiment of the present invention may be incorporated into a construction machine that includes a mechanism for turning a turning body.

Referring to FIG. 1, an upper-part turning body 3 (an upper-part turnable body) is mounted through a turning mechanism 2 on a lower-part traveling body 1 (a lower-part movable body) of the shovel. A boom 4 is attached to the upper-part turning body 3. An arm 5 is attached to an end of the boom 4. A bucket 6 is attached to an end of the arm 5. The boom 4, the arm 5, and the bucket 6 are hydraulically driven by a boom cylinder 7, an arm cylinder 8, and a bucket cylinder 9, respectively. Furthermore, a cabin 10 and power sources such as an engine are mounted on the upper-part turning body 3.

The shovel illustrated in FIG. 1 includes an electrical energy storage unit that stores electric power to be supplied to the turning drive unit. Embodiments of the present invention, however, may be applied to any shovel, even to, for example, an electrically driven shovel supplied with charging electric power from an external power supply, as long as the shovel adopts electric turning.

Figure 2:
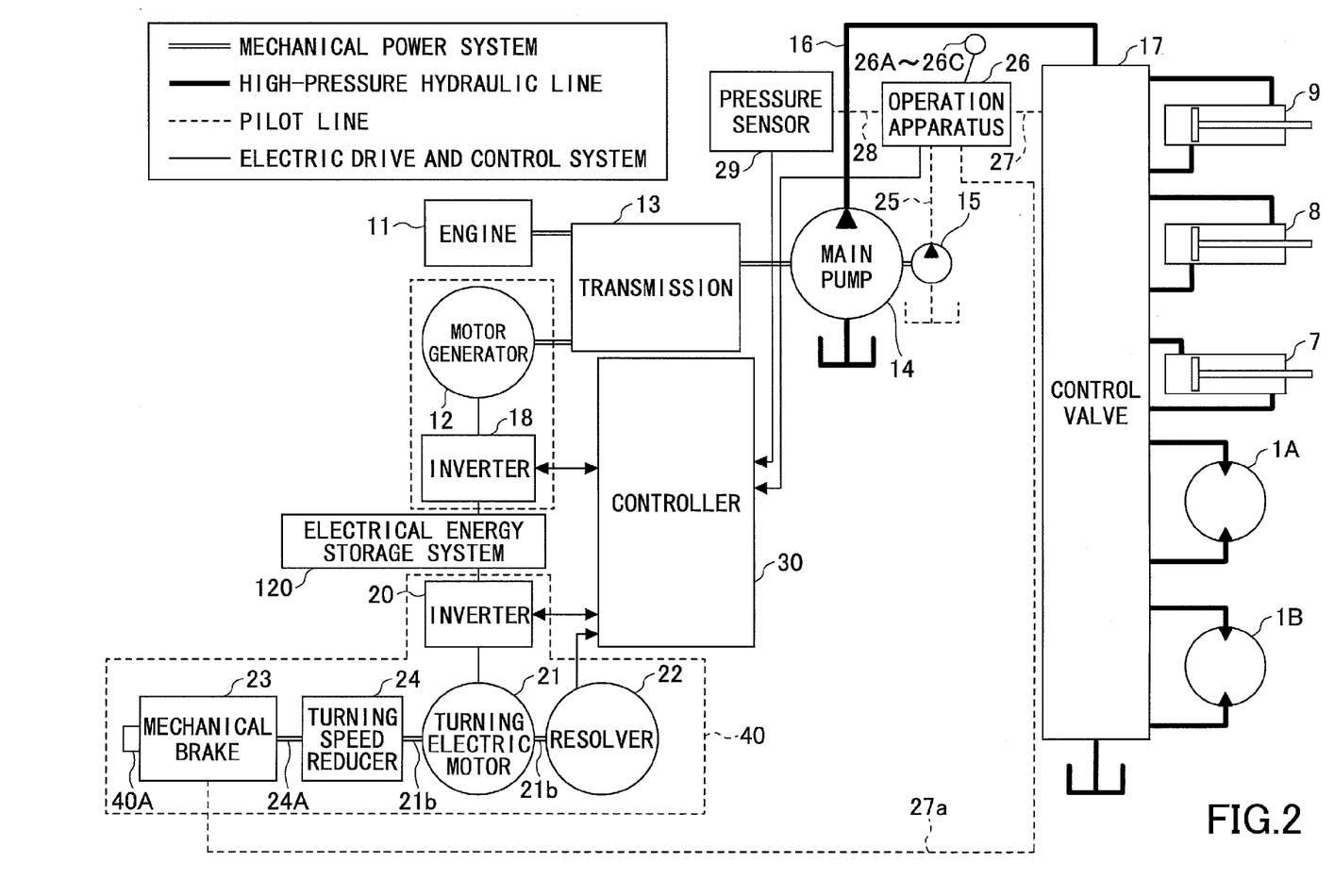
FIG. 2 is a block diagram illustrating a configuration of a drive system of the shovel illustrated in FIG. 1.

FIG. 2 is a block diagram illustrating a configuration of a drive system of the shovel illustrated in FIG. 1. in FIG. 2, a mechanical power system, a high-pressure hydraulic line, a pilot line, and an electric drive and control system are indicated by a double line, a bold solid line, a broken line, and a fine solid line, respectively.

An engine 11 as a mechanical drive part and a motor generator 12 as an assist drive part are connected to a first input shaft and a second input shaft, respectively, of a transmission 13. A main pump 14 and a pilot pump 15 are connected to the output shaft of the transmission 13 as hydraulic pumps. A control valve 17 is connected to the main pump 14 via a high-pressure hydraulic line 16. Furthermore, an operation apparatus 26 is connected to the pilot pump 15 via a pilot line 25.

The control valve 17 is a control unit that controls a hydraulic system in the hybrid shovel. Hydraulic motors 1A (right) and 1B (left) for the lower-part traveling body 1, the boom cylinder 7, the arm cylinder 8, and the bucket cylinder 9, are connected to the control valve 17 via high-pressure hydraulic lines.

An electrical energy storage system (an electrical energy storage unit) 120 including a capacitor as an electrical energy storage device is connected to the motor generator 12 via an inverter 18. A turning electric motor 21 as an electric work element is connected to the electrical energy storage system 120 via an inverter 20. A resolver 22 and a turning speed reducer 24 are connected to an output shaft 21b of the turning electric motor 21. A mechanical brake 23 is connected to an output shaft 24A of the turning speed reducer 24. The turning electric motor 21, the resolver 22, the mechanical brake 23, and the turning speed reducer 24 form a turning drive unit 40 as a load drive system. Here, the turning electric motor 21 corresponds to a turning electric motor for turning the upper-part taming body 3, and the mechanical brake 23 corresponds to a brake unit that mechanically brakes the upper-part turning body 3 in order to maintain the upper-part turning body 3 in a state where turning is stopped.

The operation apparatus 26 includes a lever 26A, a lever 26B, and a pedal 26C. The lever 26A, the lever 26B, and the pedal 26C are connected to the control valve 17 and a pressure sensor 29 via a hydraulic line 27 and a hydraulic line 28, respectively. The pressure sensor 29 is connected to a controller 30 that controls driving of an electric system.

The controller 30 is a control unit serving as a main control part that controls driving of the hybrid shovel. The controller 30 includes a processor including a CPU (Central Processing Unit) and an internal memory. The controller 30 is a unit that is implemented by the CPU executing a drive control program contained in the internal memory.

The controller 30 converts a signal fed from the pressure sensor 29 into a speed command, and controls driving of the turning electric motor 21. The signal fed from the pressure sensor 29 corresponds to a signal that represents the amount of operation in the case of operating the operation apparatus 26 in order to cause the turning mechanism 2 to turn.

The controller 30 controls the operation (switches the electric motor [assist] operation and the generator operation) of the motor generator 12, and controls the charge and discharge of the capacitor by controlling driving of a step-up/step-down converter of the electrical energy storage system 120. The controller 30 controls the charge and discharge of the capacitor by controlling the switching of the step-up operation and the step-down operation of the step-up/step-down converter of the electrical energy storage system 120 based on the state of charge of the capacitor, the operating state (electric motor [assist] operation or generator operation) of the motor generator 12, and the operating state (power running operation or regenerative operation) of the turning electric motor 21. Furthermore, the controller 30 also controls the amount of charging the capacitor (charging current or charging electric power) as described below.

In the work performed by the shovel of the above-described configuration, the turning electric motor 21 is driven with electric power supplied via the inverter 20 in order to cause the upper-part turning body 3 to turn. The rotational force of the output shaft 21b of the turning electric motor 21 is transmitted to an output shaft 40A of the turning drive unit 40 via the turning speed reducer 24 and the mechanical brake 23.

Figure 3:
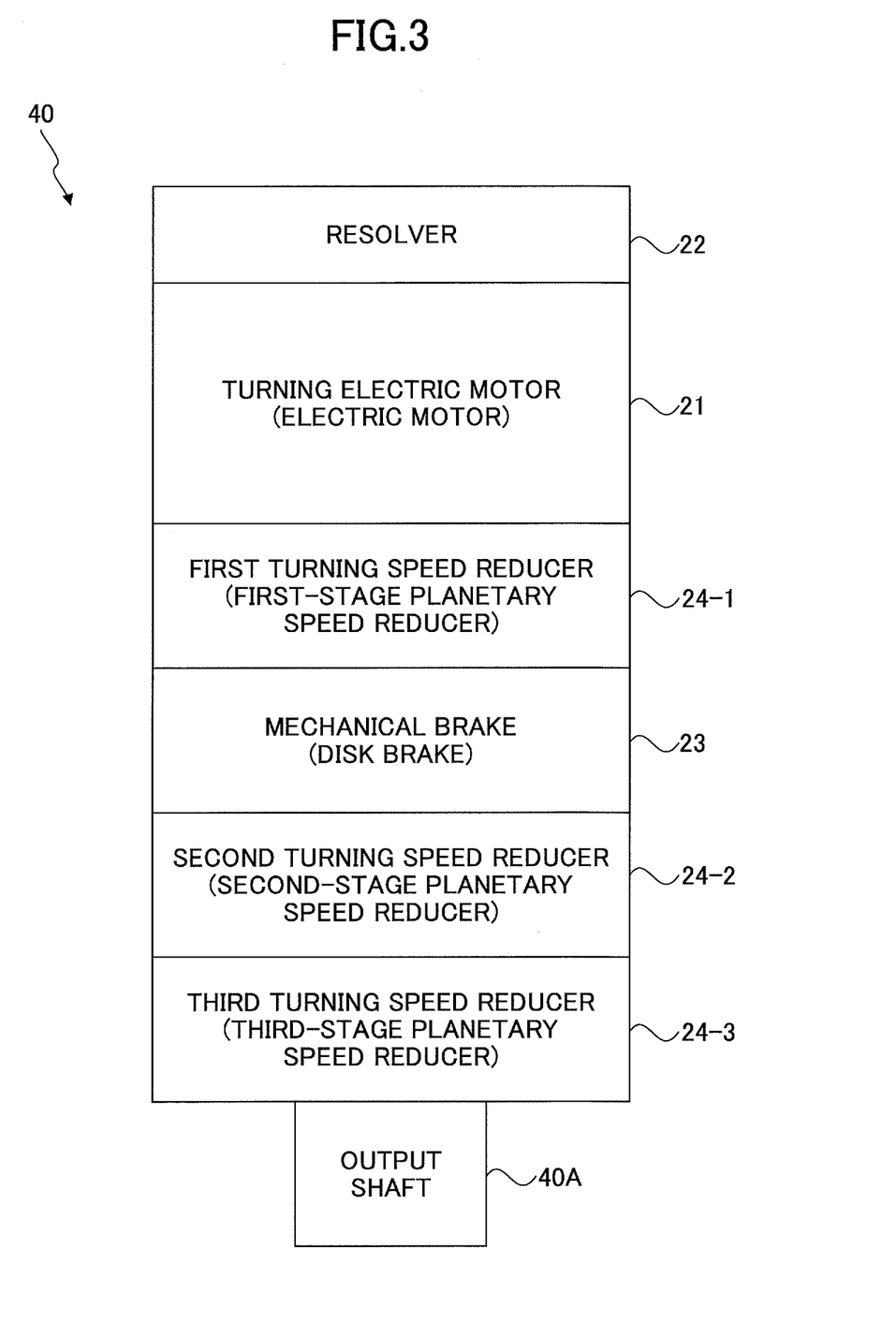
FIG. 3 is a block diagram illustrating a configuration of a turning drive unit according to an embodiment of the present invention.

FIG. 3 is a block diagram illustrating a configuration of the turning drive unit 40 according to an embodiment of the present invention. As described above, the turning drive unit 40 includes the turning electric motor 21, which is an electric motor serving as a drive source. The turning speed reducer 24 is connected to the output shaft side of the turning electric motor 21.

Specifically, the turning speed reducer 24 includes the three-stage configuration of a first turning speed reducer 24-1, a second turning speed reducer 24-2, and a third turning speed reducer 24-3. Each of the first turning speed reducer 24-1, the second turning speed reducer 24-2, and the third turning speed reducer 24-3 includes a planetary speed reducer. To be more specific, the first turning speed reducer 24-1 at the first stage is attached to the turning electric motor 21. Furthermore, a disk brake serving as the mechanical brake 23 is provided on a planetary carrier 46 (FIG. 5) that serves as the output shaft of the first turning speed reducer 24-1. Furthermore, the second turning speed reducer 24-2 at the second stage is attached to the first turning speed reducer 24-1 with the mechanical brake 23 being interposed between the first turning speed reducer 24-1 and the second turning speed reducer 24-2, and the third turning speed reducer 24-3 at the third stage is attached to the second turning speed reducer 24-2. The output shaft of the third turning speed reducer 24-3 serves as the output shaft 40A of the turning drive unit 40. Although not graphically represented, the output shaft 40A of the turning drive unit 40 is connected to the turning mechanism 2, so that the turning mechanism 2 is driven by the rotational force of the output shaft 40A.

Figure 4:
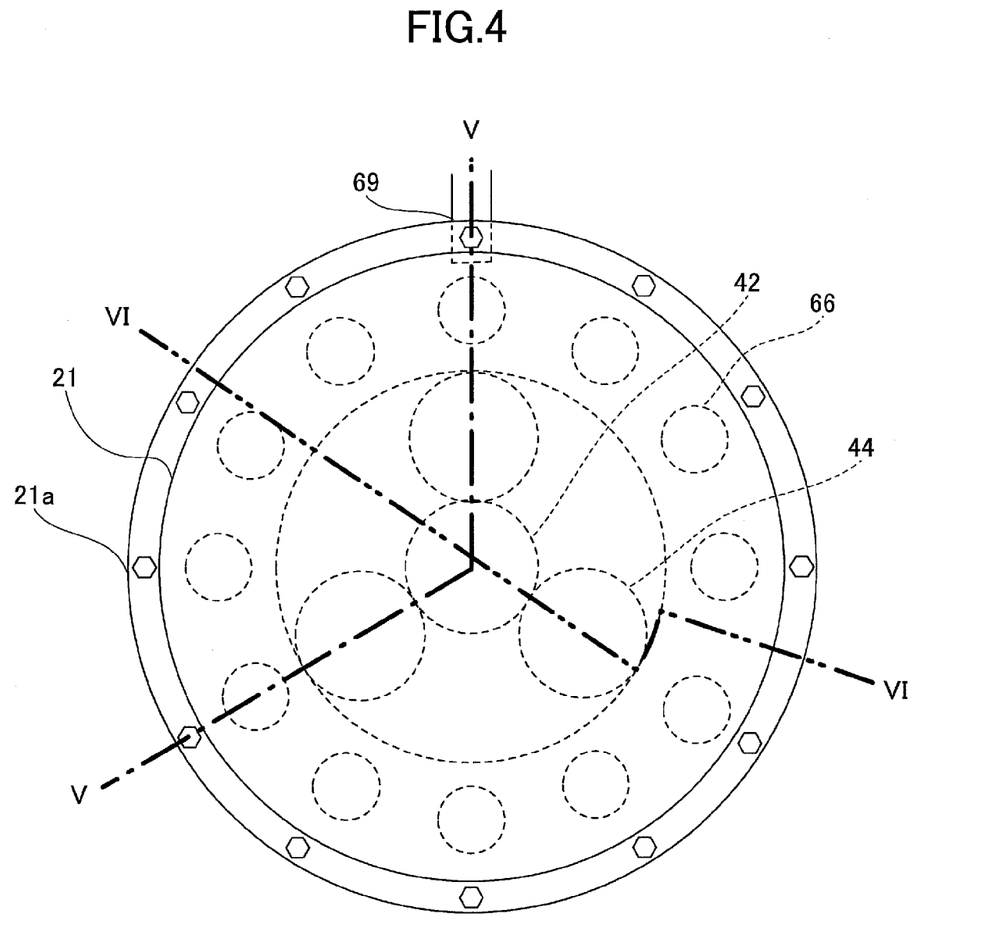
FIG. 4 is a plan view of the turning drive unit of FIG. 3.
Figure 5:
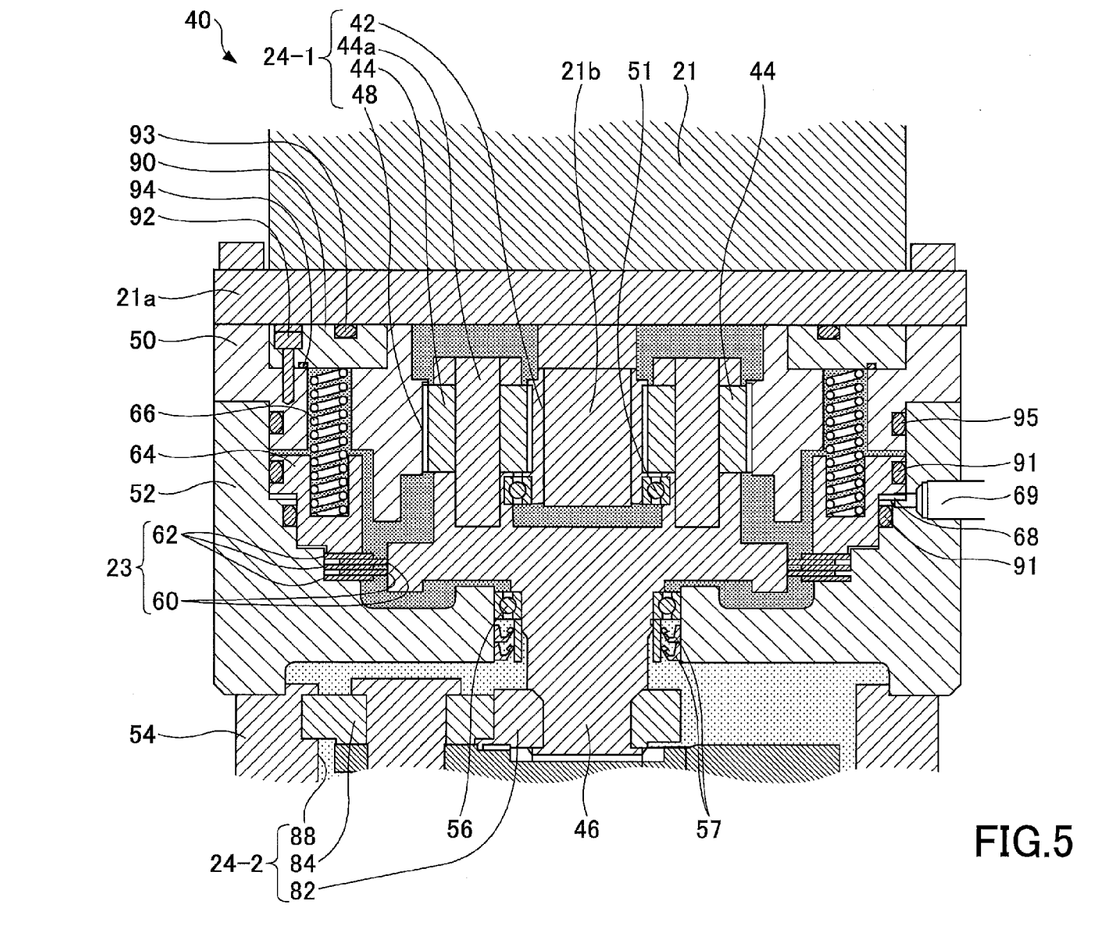
FIG. 5 is a cross-sectional view of the turning drive unit, taken along the line V-V of FIG. 4.

Next, a description is given, with reference to FIG. 4 and FIG. 5, of a specific configuration of the turning drive unit 40. FIG. 4 is a plan view of the turning drive unit 40. In FIG. 4, broken lines indicate the hidden outlines of components of the first turning speed reducer 24-1. Furthermore, FIG. 5 is a cross-sectional view of the turning drive unit 40, taken along the line V-V of FIG. 4.

Furthermore, FIG. 5 is a cross-sectional view of part of the turning drive unit 40 that forms the first turning speed reducer 24-1 and the mechanical brake 23. In this embodiment, a sun gear 42 of a planetary speed reducer forming the first turning speed reducer 24-1 is fixed to the output shaft 21b of the turning electric motor 21. Furthermore, the sun gear 42 is rotatably supported by the planetary carrier 46 via a bearing 51. Furthermore, the sun gear 42 meshes with each of three planetary gears 44. Each of the planetary gears 44 is rotatably supported via a pin 44a on the planetary carrier 46 forming the output shaft of the first turning speed reducer 24-1. Each of the planetary gears 44 meshes with an internal gear 48 formed on the interior surface of a first gear case 50.

The first gear case 50, on which the internal gear 48 is formed, is fixed to an end plate 21a of the turning electric motor 21 so as to be prevented from rotating. On the other hand, the planetary carrier 46, which forms the output shaft of the first turning speed reducer 24-1, is supported via a bearing 56 so as to foe rotatable relative to a second gear case 52 fixed to the first gear case 50.

The above-described first turning speed reducer 24-1 has a structure such that lubricant oil for lubricating gears is hermetically sealed in by the end plate 21a and the output shaft 21b of the turning electric motor 21, the first gear case 50, the second gear case 52, and the planetary carrier 46.

In the first turning speed reducer 24-1 of the above-described configuration, when the output shaft 21b of the turning electric motor 21 rotates to cause the sun gear 42 to rotate, the planetary gears 44 rotate. The planetary gears 44 mesh with the internal gear 48 formed on the interior surface of the first gear case 50. Therefore, a force in a direction to cause the first gear case 50, on which the internal gear 48 is formed, to rotate, is applied by the rotational force of the planetary gears 44. The first gear case 50, however, is fixed to the end plate 21a of the turning electric motor 21 so as to be prevented from rotating. As a result, the planetary carrier 46, which is rotatably supported while supporting the planetary gears 44, rotates. By the gear action as described above, the rotational speed of the output shaft 21b of the turning electric motor 21 is reduced and output from the planetary carrier 46.

Next, a description is given of a structure of a disk brake that forms the mechanical brake 23. The disk brake is formed between the second gear case 52, which is a stationary part, and the planetary carrier 46, which is an output shaft. Brake disks 60 extend outward in a direction of a radius of rotation from the periphery of the planetary carrier 46. The brake disks 60 are connected to the planetary carrier 46 via a connecting structure such as a spline connection so as to be prevented from rotating relative to the planetary carrier 46 but movable in the axial directions of the planetary carrier 46.

A brake plate 62 is placed on each of the upper side and the lower side of each of the brake disks 60. The brake plates 62 are connected to the interior surface of the second gear case 52 via a connecting structure such as a spline connection so as to be prevented from rotating relative to the second gear case 52, which is a stationary part, but movable in the axial directions of the planetary carrier 46. This embodiment adopts a configuration where each of the two brake disks 60 is held between corresponding two of the three brake plates 62. Embodiments of the present invention, however, are not limited to this configuration. For example, a single brake disk 60 may alternatively be held between two brake plates 62 or each of three or more brake disks 60 may alternatively be held between corresponding two of four or more brake plates 62.

A piston 64 is placed on a topmost one of the brake plates 62 so as to be movable in the axial directions of the planetary carrier 46. The piston 64 is pressed against the topmost one of the brake plates 62 by springs 66. According to this embodiment, coil springs are used as the springs 66. Alternatively, it is also possible to use Belleville washers stacked on top of each other in multiple tiers, which may produce high output with a small deflection.

The brake plates 62 and the brake disks 60 are movable in the axial directions of the planetary carrier 46. Therefore, when the topmost one of the brake plates 62 is pressed by the piston 64, each of the brake disks 60 is held and pressed between corresponding upper and lower ones of the brake plates 62. The surfaces of the brake plates 62 and the brake disks 60 are covered with a coating of a high coefficient of friction. Each of the brake disks 60 is held and pressed between corresponding two of the brake plates 62, so that a brake force to prevent the rotations of the brake disks 60 acts on the brake disks 60. Furthermore, the brake disks 60 are connected to the planetary carrier 46 in a non-rotatable manner. Therefore, the brake force that acts on the brake disks 60 serves as a brake force applied to the planetary carrier 46. This makes it possible to stably maintain a state where the turning of the upper-part turning body 3 is stopped.

A hydraulic space 68 into which hydraulic fluid is suppliable is formed between the piston 64 and the second gear case 52. A brake release port 69 is connected to the hydraulic space 68. Furthermore, sealing members 91 such as O-rings are placed between the piston 64 and the second gear case 52 so as to seal the hydraulic space 68 to prevent a leakage of hydraulic fluid from the hydraulic space 68. When a hydraulic pressure is supplied from the pilot pump 15 to the hydraulic space 68 via the operation apparatus 26, a hydraulic line 27a (FIG. 2), and the brake release port 69, the piston 64 is pressed upward by the hydraulic pressure, so that a force to press the brake plates 62 is lost. As a result, the brake is released.

According to this embodiment, in the first turning speed reducer 24-1 of the above-described configuration, an annular recess is formed on an upper surface of the first gear case 50, and multiple through holes are formed at the bottom of the annular recess. The springs 66 are inserted in the corresponding through holes. Respective lower ends of the springs 66 project from the corresponding through holes of the first gear case 50 to be in contact with the bottom surfaces of corresponding holes formed in the piston 64. A spring holding member 90 is fitted in the annular recess of the first gear case 50. The spring holding member 90 is fastened and fixed to the first gear case 50 by multiple bolts 92.

Before the spring holding member 90 is fixed to the first gear case 50 in the annular recess, respective upper ends of the springs 66 are projecting upward from the bottom surface of the annular recess. Accordingly, at the time of fixing the spring holding member 90 to the first gear case 50 in the annular recess, the springs 66 are pressed and compressed by the spring holding member 90. With the spring holding member 90 being fixed to the first gear case 50 in the annular recess, the springs 66 are held and compressed between the spring holding member 90 and the piston 64. The resilience (spring force) of each of the springs 66 at this point serves as a force to press the piston 64 (that is, the brake plates 62) against the brake disks 60, and becomes a brake force applied to the planetary carrier 46.

With the spring holding member 90 being fixed to the first gear case 50 in the annular recess, the entire spring holding member 90 is accommodated inside the annular recess. Therefore, the spring holding member 90 is prevented from projecting from a matching surface of the first gear case 50 which surface combs into contact with the end plate 21a (which may also be called "flange") of the turning electric motor 21. Accordingly, the matching surface of the first gear case 50 alone comes into contact with the end plate 21a of the turning electric motor 21. On an upper surface of the spring holding member 90, however, a sealing member 93 such as an O-ring is placed to provide sealing to prevent lubricant oil that lubricates and cools the planetary gears 44 inside the first gear case 50 from leaking out. Furthermore, a sealing member 94 such as an O-ring is placed on a lower surface of the spring holding member 90 to provide sealing to prevent lubricant oil filling in a part where the springs 66 are accommodated from leaking out. Likewise, a sealing member 95 such as an O-ring is placed between the first gear case 50 and the second gear case 52 to provide sealing to prevent lubricant oil filling in the part where the springs 66 are accommodated from leaking out.

Figure 6:
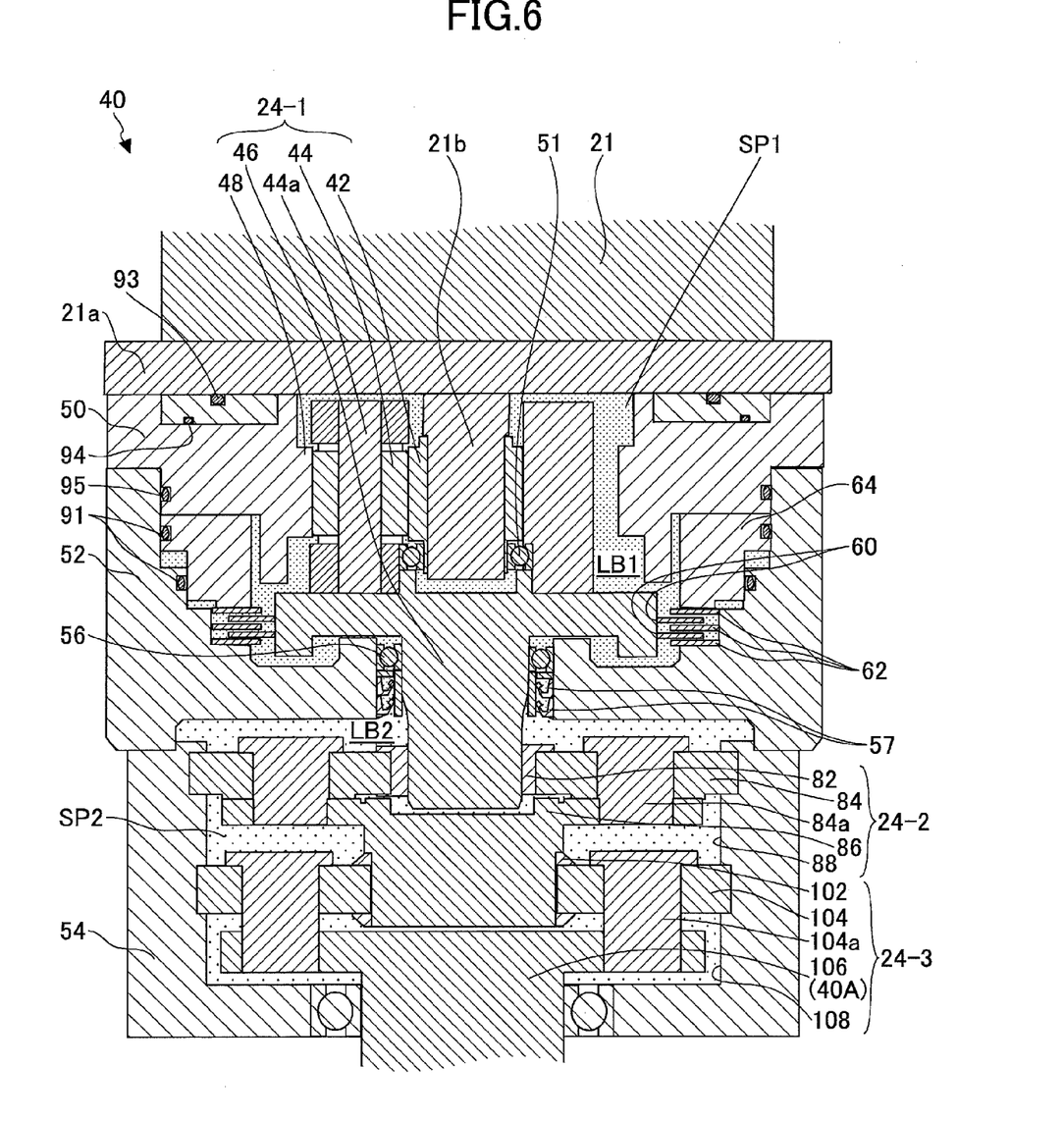
FIG. 6 is a cross-sectional view of the turning drive unit, taken along the line VI-VI of FIG. 4, illustrating a state of the turning drive unit at the time when an output shaft of a turning electric motor is stationary.

Next, a description is given, with reference to FIG. 6, of transmission of a rotational driving force in the turning drive unit 40. FIG. 6 is a cross-sectional view of the turning drive unit 40, taken along the line VI-VI of FIG. 4, illustrating a state of the turning drive unit 40 at the time when the output shaft 21b of the turning electric motor 21 is stationary.

Referring to FIG. 6, the first turning speed reducer 24-1 includes a planetary gear mechanism including the sun gear 42, the planetary gears 44, the planetary carrier 46, and the internal gear 48. The second turning speed reducer 24-2 includes a planetary gear mechanism including a sun gear 82, planetary gears 84, a planetary carrier 86, and an internal gear 88. Likewise, the third turning speed reducer 24-3 includes a planetary gear mechanism including a sun gear 102, planetary gears 104, a planetary carrier 106, and an internal gear 108.

In the first turning speed reducer 24-1, the sun gear 42 is fixed to the output shaft 21b of the turning electric motor 21 and meshes with the planetary gears 44. The planetary gears 44 revolve around the sun gear 42 between the sun gear 42 and the internal gear 48, formed on the interior wall surface of the first gear case 50, while rotating. According to this embodiment, the first turning speed reducer 24-1 includes the three planetary gears 44. Each of the three planetary gears 44 causes the planetary carrier 46 to rotate by revolving around the sun gear 42 while rotating. The planetary carrier 46 forms the output shaft of the first turning speed reducer 24-1.

In the second turning speed reducer 24-2, the sun gear 82 is fixed to the planetary carrier 46 serving as the output shaft of the first turning speed reducer 24-1, and meshes with the planetary gears 84. The planetary gears 84 revolve around the sun gear 82 between the sun gear 82 and the internal gear 88, formed on the interior wall surface of a third gear case 54, while rotating. According to this embodiment, the second turning speed reducer 24-2 includes the three planetary gears 84. Each of the three planetary gears 84 is rotatably supported on the planetary carrier 86 through a corresponding one of pins 84a, and causes the planetary carrier 86 to rotate by revolving around the sun gear 82 while rotating. The planetary carrier 86 forms the output shaft of the second turning speed reducer 24-2.

In the third turning speed reducer 24-3, the sun gear 102 is fixed to the planetary carrier 86 serving as the output shaft of the second turning speed reducer 24-2, and meshes with the planetary gears 104. The planetary gears 104 revolve around the sun gear 102 between the sun gear 102 and the internal gear 108, formed on the interior wall surface of the third gear case 54, while rotating. According to this embodiment, the third turning speed reducer 24-3 includes the three planetary gears 104. Each of the three planetary gears 104 is rotatably supported on the planetary carrier 106 through a corresponding one of pins 104a, and causes the planetary carrier 106 to rotate by revolving around the sun gear 102 while rotating. The planetary carrier 106 forms the output shaft 40A of the turning speed reducer 24.

By the above-described configuration, the turning drive unit 40 reduces the rotational speed of the output shaft 21a of the turning electric motor 21 and increases the torque of the output shaft 40A.

Specifically, the turning drive unit 40 causes the planetary carrier 46 to rotate clockwise by causing the planetary gears 44, in accordance with the high-speed, low-torque clockwise rotation of the output shaft 21b, to revolve clockwise around the sun gear 42 while rotating counterclockwise. Then, the turning drive unit 40 causes the planetary carrier 86 to rotate clockwise by causing the planetary gears 84, in accordance with the clockwise rotation of the planetary carrier 46, to revolve clockwise around the sun gear 82 while rotating counterclockwise. Furthermore, the turning drive unit 40 causes the planetary carrier 106, that is, the output shaft 40A, to rotate clockwise at low speed with high torque by causing the planetary gears 104, in accordance with the clockwise rotation of the planetary carrier 86, to revolve clockwise around the sun gear 102 while rotating counterclockwise. In the case where the output shaft 21b rotates counterclockwise, the turning drive unit 40 operates in the same manner except that each gear rotates in the reverse direction.

Furthermore, the turning drive unit 40 includes a space SP1 hermetically sealed by the output shaft 21b, the end plate 21a, the first gear case 50, the second gear case 52, and the planetary carrier 46. An oil seal (not graphically represented) is attached to the output shaft 21b. Furthermore, two oil seals 57 are attached to the planetary carrier 46 below the bearing 56. The space SP1 accommodates the sun gear 42, the planetary gears 44, the planetary carrier 46, the brake disks 60, the brake plates 62, and the piston 64, which are lubricated by lubricant oil LS1, which is indicated by a fine dot pattern in FIG. 6.

Furthermore, the turning drive unit 40 includes a space SP2 hermetically sealed by the planetary carrier 46, the second gear case 52, the third gear case 54, and the planetary carrier 106. An oil seal (not graphically represented) is attached to the planetary carrier 106, The space SP2 accommodates the sun gears 82 and 102, the planetary gears 84 and 104, and the planetary carriers 86 and 106, which are lubricated by lubricant oil LB2, which is indicated by a coarse dot pattern in FIG. 6. The lubricant LB2 is separated from the lubricant oil LB1 by the oil seals 57. Furthermore, the lubricant oil LB2 may be of either the same kind as or a different kind from the lubricant oil LB1. For example, in the turning drive unit 40, the lubricant oil LB1 for high-speed rotation may be different in kind from the lubricant oil LB2 for low-speed rotation.

Figure 7A:
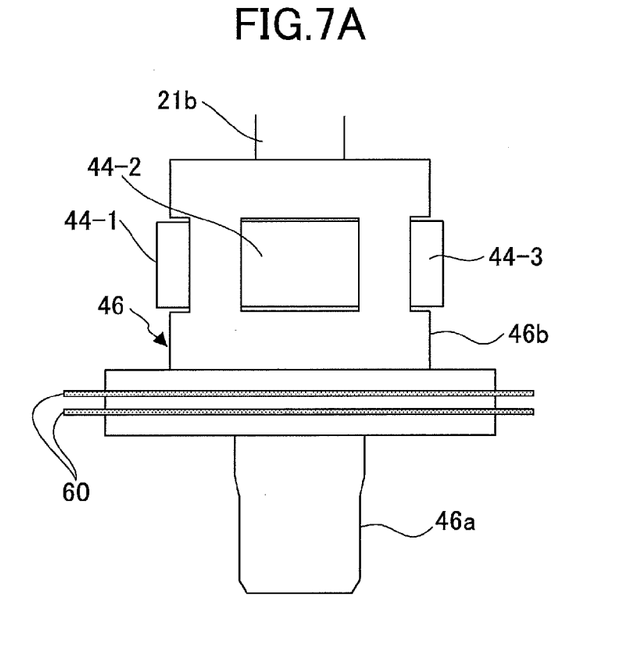
FIGS. 7A, 7B and 7C are detail views of a planetary carrier of a first turning speed reducer.
Figure 7B:
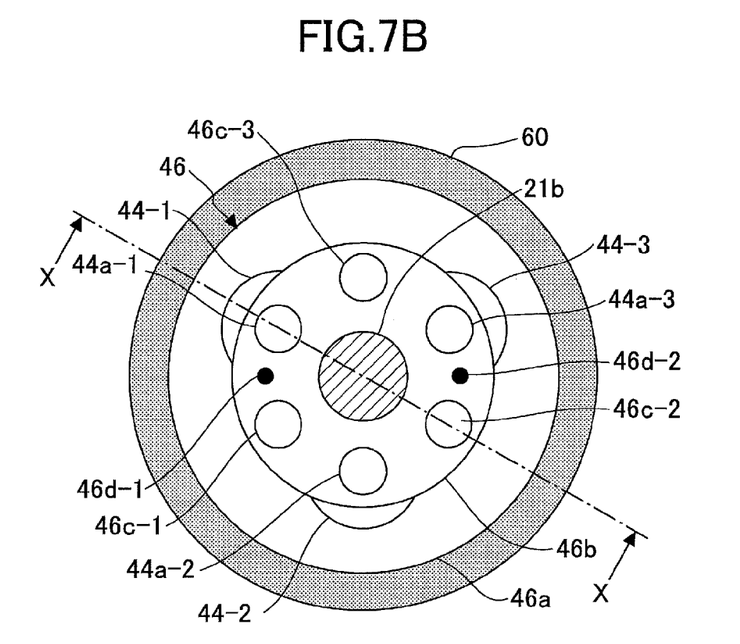
Figure 7C:
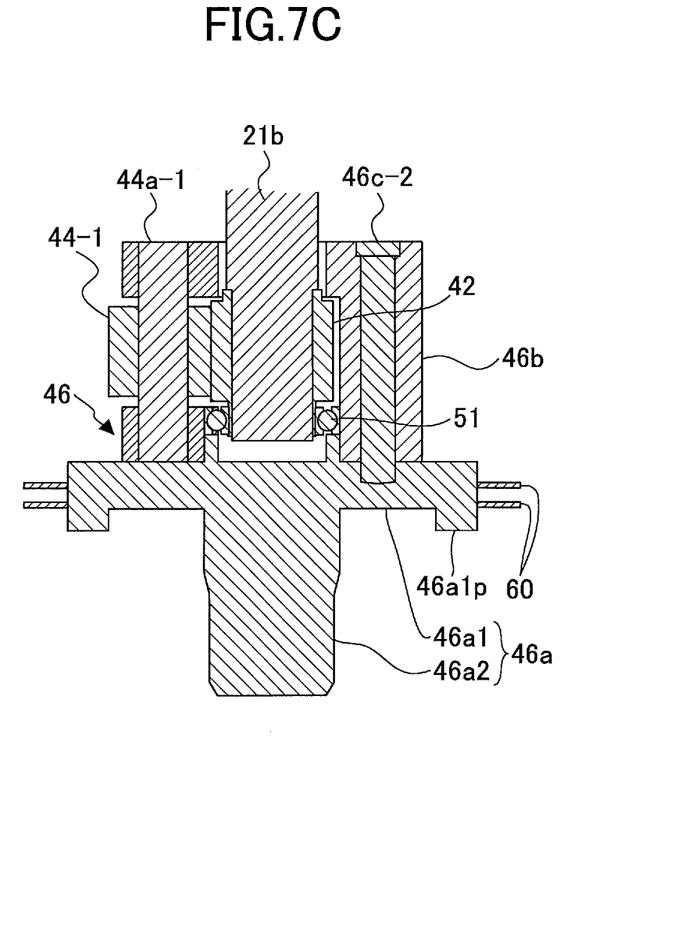

Next, a description is given in detail, with reference to FIGS. 7A, 7B and 7C, of the planetary carrier 46, which serves as the output shaft of the first turning speed reducer 24-1. FIGS. 7A through 7C are detail views of the planetary carrier 46. FIGS. 7A and 7B are a front view and a plan view, respectively, of the planetary carrier 46. FIG. 7C is a cross-sectional view of the planetary carrier 46, where a plane perpendicular to the plane of paper of FIG. 7B, indicated by a dot-dash line, is viewed in a direction indicated by arrows X.

As illustrated in FIGS. 7A through 7C, the planetary carrier 46 includes an output shaft part 46a, which forms an output shaft, and a carrier part 46b, by which three planetary gears 44-1, 44-2, and 44-3 are rotatably held.

The output shaft part 46a includes a radially extended disk portion 46a1 and an axially elongated columnar portion 46a2.

At an outer radial end of the disk portion 46a1, the disk portion 46a1 includes a disk holding portion 46a1p that holds the brake disks 60. According to this embodiment, the disk holding portion 46a1p holds the two brake disks 60, and is thicker than other part of the disk portion 46a1 positioned radially inside the disk holding portion 46a1p. This configuration makes it possible to increase the stiffness of the disk holding portion 46a1p against a force received from the brake disks 60 at the time of braking, compared with the case where the disk holding portion 46a1p have the same thickness (length in an axial direction) as other part of the disk portion 46a1. Furthermore, this also makes if possible to increase the number of brake disks attached to the disk holding portion 46a1p.

The carrier part 46b is a member detachable from and reattachable to the output shaft part 46b. According to this embodiment, the carrier part 46b is a columnar member that accommodates the sun gear 42, fixed to the output shaft 21b of the turning electric motor 21, and the three planetary gears 44-1, 44-2 and 44-3. Furthermore, the carrier part 46b is fastened to the output shaft part 46a using three bolts 46c-1, 46c-2 and 46c-3 (hereinafter also collectively referred to as "bolts 46c"), which are fastening members. Furthermore, the planetary gears 44-1, 44-2 and 44-3 (hereinafter also collectively referred to as "planetary gears 44") are rotatably supported by the carrier part 46b using three pins 44a-1, 44a-2 and 44a-3 (hereinafter also collectively referred to as "pins 44a").

According to this embodiment, the three bolts 46c are inserted into bolt holes formed in the carrier part 46b at 120-degree intervals around its central axis. The bolts 46c are then screwed into tap holes (not graphically represented) formed on an upper surface of the disk portion 46a1 of the output shaft part 46a to fasten the carrier part 46b to the output shaft part 46a. Furthermore, the three pins 44a are inserted into pin holes formed in the carrier part 46b at 120-degree intervals around its central axis so as to alternate with the three bolts 46c at 60-degree intervals. The pins 44a are then fixed with the corresponding planetary gears 44 being rotatably supported by the pins 44a.

According to this embodiment, the respective central axes of the three bolts 46c are positioned on the circumference of the same circle whose center coincides with the central axis of the carrier part 46b. Furthermore, the respective central axes of the three pins 44a are positioned on the circumference of the same circle whose center coincides with the central axis of the carrier part 46b. The respective central axes of the three bolts 46c and the respective central axes of the three pins 44a are positioned on the circumference of the same circle whose center coincides with the central axis of the carrier part 46b. Embodiments of the present invention, however, are not limited to this configuration. For example, the respective central axes of the three bolts 46c may alternatively pass through a circle different from a circle through which the respective central axes of the three pins 44a pass.

Furthermore, two tap holes 46d-1 and 46d-2 (hereinafter also collectively referred to as "tap holes 46d") for preventing the carrier part 46b and the output shaft part 46a from rotating together when fastening or loosening the three bolts 46c serving as fastening members are formed in the carrier part 46b. According to this embodiment, the two tap holes 46d are formed at positions symmetrical about the central axis of the carrier part 46b.

Here, a description is given, with reference to FIGS. 7A through 7C and FIG. 8, of a method of removing the carrier part 46b from the output shaft part 46a by, for example, a worker.

Figure 8:
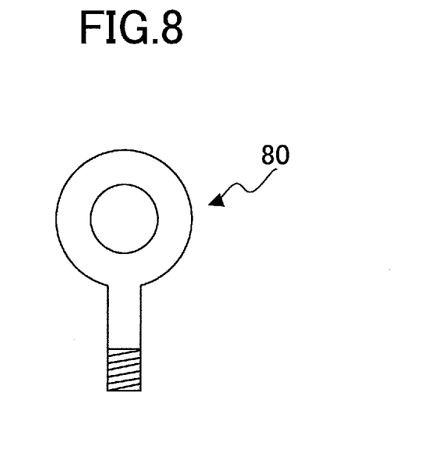
FIG. 8 is a front view of an eyebolt used for disassembling and reassembling the planetary carrier.

First, a worker attaches a jig such as an eyebolt as illustrated in FIG. 8 to each of the two tap-holes 46d.

Thereafter, the worker passes a single bar-shaped member through the rings of the eyebolts 80 attached to the two tap holes 46d. The bar-shaped member is, for example, a rigid member such as a crowbar.

Thereafter, while having the bar-shaped member fixed, the worker loosens the bolts 46c using a tool such as a wrench. The fixation of the bar-shaped member prevents the carrier part 46b from rotating with the output shaft part 46a when loosening the bolts 46c.

The above description, which relates to the method of removing the carrier part 46b from the output shaft part 46a by a worker, may also be applied to the case of attaching the carrier part 46b to the output shaft part 46a by a worker.

As described above, the output shaft part 46a is a unitary structure of the disk portion 46a1, to which the brake disks 60 are connected, and the columnar portion 46a2, which is connected to the sun gear 82 of the second turning speed reducer 24-2. Therefore, no wear is caused between the disk portion 46a1 and the columnar portion 46a2. Furthermore, it is possible to increase the proof stress of the output shaft part 46a against a braking reaction force generated at the time of braking by a brake unit.

Furthermore, the carrier part 46b is connected to the output shaft part 46a using the bolts 46c serving as fastening members, without employing spline connection or serration connection. Therefore, it is possible to reduce wear at connections.

Furthermore, the output shaft part 46a and the carrier part 46b, which are separate independent members, may be manufactured of different materials. Therefore, the output shaft part 46a, which includes parts that are likely to wear out, may be formed of a material having more resistance to wear than the material of the carrier part 46b. Parts of the output shaft part 46a that are likely to wear out includes a part spline-connected to the sun gear 82 of the second turning speed reducer 24-2 and a part spline-connected to the brake disks 60. On the other-hand, the carrier part 46b, which is not required to have high resistance to wear, may be formed of a relatively low-cost material. As a result, this structure of the planetary carrier 46 makes it possible to prevent an increase in manufacturing costs while increasing the wear resistance of parts that are likely to wear out, compared with the case of forming the output shaft part 46a and the carrier part 46b as a unitary structure. Furthermore, the increased wear resistance makes it possible to extend the cycle of replacement of the output shaft part 46a and thus to reduce replacement costs. Furthermore, because the output shaft part 46a and the carrier part 46b are separate independent members, there is no need to time the replacement of the carrier part 46b to coincide with the replacement of the output shaft part 46a, whose cycle of replacement is relatively short. Furthermore, the output shaft part 46a may be replaced by simply separating the output shaft part 46a and the carrier part 46b without removing the planetary gears 44 from the carrier part 46b. Therefore, it is possible to simplify the operation of replacing the output shaft part 46a.

Furthermore, the tap holes 46d, to which jigs such as the eyebolts 80 are attachable, are provided on an upper surface of the carrier part 46b. Therefore, it is possible to increase the assemblability and disassemblability of the planetary carrier 48. In the above-described embodiment, the two tap holes 46d are formed on the upper surface of the carrier part 46b. Alternatively, three or more tap holes may be formed. In this case, a single bar-shaped member is passed through the rings of the two eyebolts 80 attached to two of the three or more tap holes.

All examples and conditional language provided herein are intended for pedagogical purposes of aiding the reader in understanding the invention and the concepts contributed by the inventors to further the art, and are not to be construed as limitations to each specifically recited examples and conditions, nor does the organization of such examples in the specification relate to a showing of the superiority or inferiority of the invention. Although one or more embodiments of the present invention have been described in detail, it should be understood that the various changes, substitutions, and alterations could be made hereto without departing from the spirit and scope of the invention.

For example, in the above-described embodiment, the carrier part 46b is fastened to the output shaft part 46a using the three bolts 46c serving as fastening members. Embodiments of the present invention, however, are not limited to this configuration. For example, the carrier part 46b may alternatively be fastened to the output shaft part 46a using one, two, or four or more fastening members.

Furthermore, in the above-described embodiment, the bolts 46c are inserted into bolt holes that extend through the carrier part 46b in its axial directions and are screwed into tap holes formed on the upper surface of the disk portion 46a1 of the output shaft part 46a. Embodiments of the present invention, however, are not limited to this configuration. For example, the bolts 46c may alternatively be inserted into bolt holes extending through the disk portion 46a1 in its axial directions and be screwed into tap holes formed on a lower surface of the carrier part 46b. In this case, the tap holes 46d, which are formed on the upper surface of the carrier part 46b, may be formed on a lower surface of the disk portion 46a1.

What is claimed is:
1. A shovel, comprising:
a turning drive unit,
the turning drive unit including
a turning electric motor;

a turning speed reducer configured to transmit a rotational driving force of the turning electric motor to a turnable body; and
a brake unit configured to maintain the turnable body in a state where turning of the turnable body is stopped,
wherein the turning speed reducer includes a planetary speed reducer including a planetary carrier,
wherein the planetary carrier includes
an output shaft part that forms an output shaft; and
a carrier part that holds a planetary gear in such a manner as to allow rotation of the planetary gear,
wherein the output shaft part and the carrier part are fastened by a fastening member,
wherein the brake unit includes a brake disk configured to rotate with the output shaft part,
wherein the output shaft part includes a radially extending disk portion, and
wherein the disk portion includes a disk holding portion at an outer radial end of the disk portion, the disk holding portion holding the brake disk.

2. The shovel as claimed in claim 1, wherein the turning drive unit further includes a spring that presses a piston, the piston being configured to press a brake plate against the brake disk.

3. A shovel, comprising:
a turning drive unit,
the turning drive unit including
a turning electric motor;
a turning speed reducer configured to transmit a rotational driving force of the turning electric motor to a turnable body; and
a brake unit configured to maintain the turnable body in a state where turning of the turnable body is stopped,
wherein the turning speed reducer includes a planetary speed reducer including a planetary carrier,
wherein the planetary carrier includes
an output shaft part that forms an output shaft; and
a carrier part that holds a planetary gear in such a manner as to allow rotation of the planetary gear,
wherein the output shaft part and the carrier part are fastened by a fastening member, and
wherein a plurality of tap holes for attaching jigs is formed in the carrier part, the jigs being used to prevent the carrier part and the output shaft part from rotating together at a time of fastening or loosening the fastening member.

4. The shovel as claimed in claim 1, wherein a plurality of tap holes for attaching jigs is formed in the carrier part, the jigs being used to prevent the carrier part and the output shaft part from rotating together at a time of fastening or loosening the fastening member.

* * * * *